United States Patent
Kim et al.

(10) Patent No.: US 8,477,884 B2
(45) Date of Patent: Jul. 2, 2013

(54) ACCELERATED TURBO TRANSCEIVER AND METHOD FOR MIMO SYSTEM

(75) Inventors: Seong Rag Kim, Daejeon (KR); Junyoung Nam, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 336 days.

(21) Appl. No.: 12/809,060

(22) PCT Filed: Dec. 11, 2008

(86) PCT No.: PCT/KR2008/007326
§ 371 (c)(1),
(2), (4) Date: Jun. 17, 2010

(87) PCT Pub. No.: WO2009/078619
PCT Pub. Date: Jun. 25, 2009

(65) Prior Publication Data
US 2010/0266073 A1   Oct. 21, 2010

(30) Foreign Application Priority Data
Dec. 17, 2007   (KR) .......................... 10-2007-0132204

(51) Int. Cl.
H04L 27/06   (2006.01)

(52) U.S. Cl.
USPC ........... 375/341; 375/219; 375/220; 375/262; 375/267; 375/295; 375/299; 375/316; 375/324; 375/340; 375/346; 455/63.1; 455/67.13; 455/101; 455/114.2; 455/132; 455/296; 455/500; 455/562.1; 370/334; 370/335; 370/342; 370/464; 714/794; 714/795; 714/796; 327/551

(58) Field of Classification Search
USPC .................. 375/219, 220, 262, 267, 295, 299, 375/316, 324, 340, 341, 346; 455/63.1, 67.13, 455/101, 114.2, 132, 296, 500, 562.1; 370/334, 370/335, 342, 464; 714/794, 795, 796; 327/551
See application file for complete search history.

(56) References Cited

U.S. PATENT DOCUMENTS

| | | | |
|---|---|---|---|
| 6,757,337 | B2 | 6/2004 | Zhuang et al. |
| 7,027,533 | B2 | 4/2006 | Abe et al. |
| 2004/0001564 | A1 | 1/2004 | Chan et al. |
| 2004/0100939 | A1* | 5/2004 | Kriedte et al. ............... 370/347 |
| 2005/0288062 | A1* | 12/2005 | Hammerschmidt et al. ......................... 455/562.1 |
| 2007/0064831 | A1 | 3/2007 | Bjerke et al. |
| 2011/0158302 | A1* | 6/2011 | Kim et al. .................... 375/224 |

OTHER PUBLICATIONS

A. Dejonghe et al., "Turbo-Equalization for Multilevel Modulation: an Efficient Low-Complexity Scheme," in Proc. IEEE ICC'02, pp. 1863-1867, 2002.

Melanie Witzke et al., 36th Asilomar conf. on Signals, Systems and Computers, "Iterative detection of MIMO signals with linear detectors", 2002.

Zhanli Liu et al., IEEE Conf. 2006, "A novel turbo equalization for MIMO frequency selective Fading Channels".

* cited by examiner

*Primary Examiner* — Leon Flores
(74) *Attorney, Agent, or Firm* — Rabin & Berdo, P.C.

(57) ABSTRACT

A reception apparatus including: a detection unit detecting extrinsic information based on a tentative symbol decision signal, a channel estimation signal, a noise variance estimation signal, and a received signal that are obtained from a previous iteration process; a Cyclic Redundancy Check (CRC) aided channel decoding unit outputting an interleaved bit or a posteriori information thereof based on the extrinsic information; a tentative symbol decision unit determining a tentative transmission symbol based on an output of the CRC aided channel decoding unit; a channel estimation unit estimating a channel based on an output of the tentative symbol decision unit; and a noise variance estimation unit estimating a noise variance based on the output of the tentative symbol decision unit and an output of the channel estimation unit is provided.

20 Claims, 7 Drawing Sheets

ACCELERATED TURBO TRANSCEIVER AND METHOD FOR MIMO SYSTEM

TECHNICAL FIELD

The present invention relates to an accelerated turbo transceiver and method for Multiple-Input Multiple-Output (MIMO) system, and more particularly, to an iterative transmission/reception apparatus and method that can improve the reception performance and also can reduce the complexity and the power consumption in a MIMO system.

This work was supported by the IT R&D program of MIC/IITA. [2006-S-001-02, Development of Adaptive Radio Access and Transmission Technologies for 4th Generation Mobile Communications]

BACKGROUND ART

Generally, an optimal receiver for a Multiple-Input Multiple-Output (MIMO) system is a joint maximum likelihood (JML) receiver of a channel and a MIMO detector. However, the optimal receiver may not be embodied in an aspect that the complexity of the optimal receiver exponentially increases with respect to a number of transmit antennas, a modulation/demodulation order, and a packet length.

A turbo receiver has been proposed to reduce the complexity of the optimal receiver. The turbo receiver consists of a maximum a posteriori (MAP) MIMO detector and a MAP channel decoder. The turbo receiver obtains performance similar to the optimal receiver by repeatedly exchanging extrinsic information between the MAP MIMO detector and the MAP channel decoder.

However, although the complexity of the conventional turbo receiver has been reduced in comparison to the optimal receiver, the complexity of the conventional turbo receiver still remains high. Therefore, various ways for reducing the complexity of the turbo receiver are being studied. In particular, researches regarding reducing the complexity of the MAP detector are being conducted.

A minimum mean squared error with soft cancellation (MMSE-SC) detector is known as the simplest way for reducing the complexity of the MAP detector. However, when the MMSE-SC detector is used, the complexity can be reduced whereas the performance can be deteriorated in comparison to the original MAP detector.

In the case of using the MAP detector, extrinsic information needs to be input. If a posteriori information with a larger amount of information than the extrinsic information is used, the turbo receiver may be diverged. Based on the above grounds, when the MMSE-SC detector is used, the extrinsic information is input as an input signal.

Also, there is another great disadvantage in that the power consumption is relatively great since the turbo receiver requires iterative operations.

Accordingly, there is a need for a method that can improve the reception performance and also can reduce the complexity and the power consumption.

DISCLOSURE OF INVENTION

Technical Problem

An aspect of the present invention provides an iterative transmission/reception apparatus and method that can improve the reception performance and also can reduce the complexity and the power consumption in a Multiple-Input Multiple-Output (MIMO) system.

Technical Solution

According to an aspect of the present invention, there is provided an iterative transmission apparatus including: at least two encoding units, each encoding a bit stream; at least two interleaving units, each interleaving the encoded bit stream; at least two Gray mapping units, each performing Gray mapping for the interleaved bit stream; at least two pilot insertion units, each inserting a pilot symbol into the mapped bit stream; and at least two transmit antennas, each transmitting the bit stream with the inserted pilot symbol, wherein the iterative transmission apparatus uses a separate interleaver for each bit stream.

According to another aspect of the present invention, there is provided an iterative reception apparatus including: a detection unit detecting extrinsic information based on a tentative symbol decision signal, a channel estimation signal, a noise variance estimation signal, and a received signal that are obtained from a previous iteration process; a Cyclic Redundancy Check (CRC) aided channel decoding unit outputting an interleaved bit or a posteriori information thereof based on the extrinsic information; a tentative symbol decision unit determining a tentative transmission symbol based on an output of the CRC aided channel decoding unit; a channel estimation unit estimating a channel based on an output of the tentative symbol decision unit; and a noise variance estimation unit estimating a noise variance based on the output of the tentative symbol decision unit and an output of the channel estimation unit.

According to still another aspect of the present invention, there is provided an iterative transmission method including: performing horizontal encoding and determining which interleaver to use before an iterative transmission is performed at a transmitter; encoding a bit stream to be transmitted to each transmit antenna; interleaving the encoded bit stream; performing Gray mapping for the interleaved bit stream; inserting a pilot symbol into the mapped bit stream; and transmitting the bit stream with the inserted pilot symbol via each transmit antenna.

According to yet another aspect of the present invention, there is provided an iterative reception method including: a detection operation of detecting extrinsic information based on a tentative symbol decision signal, a channel estimation signal, a noise variance estimation signal, and a received signal that are obtained from a previous iteration process; a CRC aided channel decoding operation of outputting an interleaved bit or a posteriori information thereof based on the extrinsic information; a tentative symbol decision operation of determining a tentative transmission symbol based on an output of the CRC aided channel decoding operation; a channel estimation operation of estimating a channel based on an output of the tentative symbol decision operation; and a noise variance estimation operation of estimating a noise variance based on the output of the tentative symbol decision operation and an output of the channel estimation operation.

MODE FOR THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, an accelerated turbo transceiver and method for a Multiple-Input Multiple-Output (MIMO) system will be described in detail with reference to the accompanying drawings. For example, the present invention will be described based on the MIMO system with $N_t$ transmit antennas and $N_r$ receive antennas.

Figure 1:
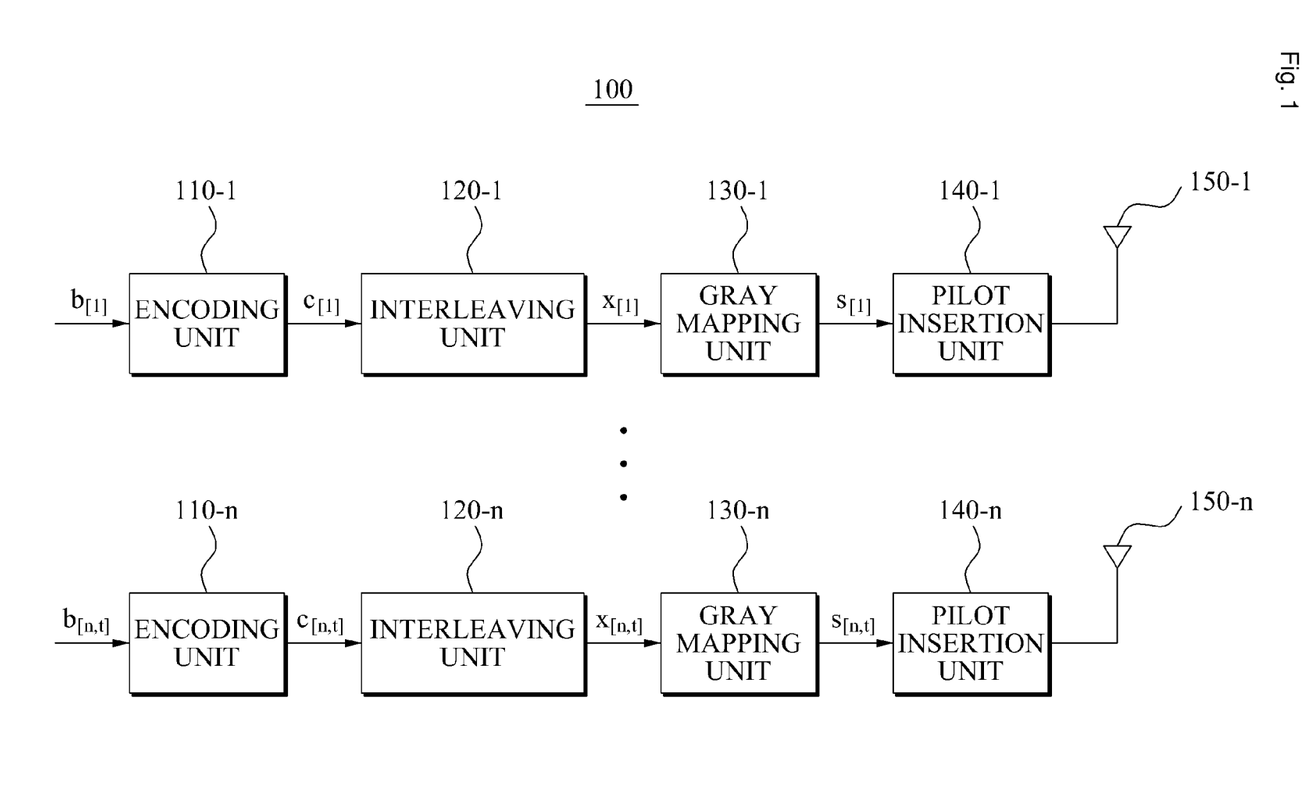
FIG. 1 is a block diagram illustrating a configuration of a transmission apparatus according to an embodiment of the present invention.

FIG. 1 is a block diagram illustrating a configuration of a transmission apparatus 100 according to an embodiment of the present invention.

Referring to FIG. 1, the transmission apparatus 100 includes encoding units 110-1, . . . , 110-n, interleaving units 120-1, . . . , 120-n, Gray mapping units 130-1, . . . , 130-n, pilot insertion units 140-1, . . . , 140-n, and transmit antennas 150-1, . . . , 150-n. Specifically, the transmission apparatus 100 is in the horizontal encoding structure and transmits a different bit stream or packet for each of the transmit antennas 150-1, . . . , 150-n.

The encoding units 110-1, . . . , 110-n may receive and encode information bit streams b to output encoded bit streams c, respectively. Specifically, the information bit streams b may be converted to the encoded bit streams c via the encoding units 110-1, . . . , 110-n, respectively.

The independency between coded bits should be secured for appropriate operations of the transmission apparatus 100. For this, the interleaving units 120-1, . . . , 120-n may receive and interleave the encoded bit streams c to output interleaved bit streams x, respectively. Specifically, the encoded bit streams c may be converted to the interleaved bit streams x via the interleaving units 120-1, . . . , 120-n, respectively.

The Gray mapping units 130-1, . . . , 130-n may receive and perform Gray mapping for the interleaved bit streams x to output information symbols s, respectively. Specifically, an Mc number of interleaved bit streams x may be converted to the information symbols s via the Gray mapping units 130-1, . . . , 130-n, respectively.

The pilot insertion units 140-1, . . . , 140-n may receive $N_i$ information symbols s and insert the $N_i$ information symbols s with $N_p$ pilot symbols to output packets or bit streams consisting of N symbols.

Next, each bit stream may be transmitted via a corresponding antenna among the transmit antennas 150-1, . . . , 150-n. For example, subscript[k] in b[k] denotes a bit stream to be transmitted via a $k^{th}$ transmit antenna 150-k.

In a conventional transmitter, $N_t$ parallel bit streams adopt the same interleaver. Conversely, in the transmission apparatus 100, bit streams may adopt different interleaving units 120-1, . . . , 120-n, respectively, to further improve the independency between bits and the performance of an iterative transmitter. When a channel is involved, the above effect may be further expanded.

Figure 2:
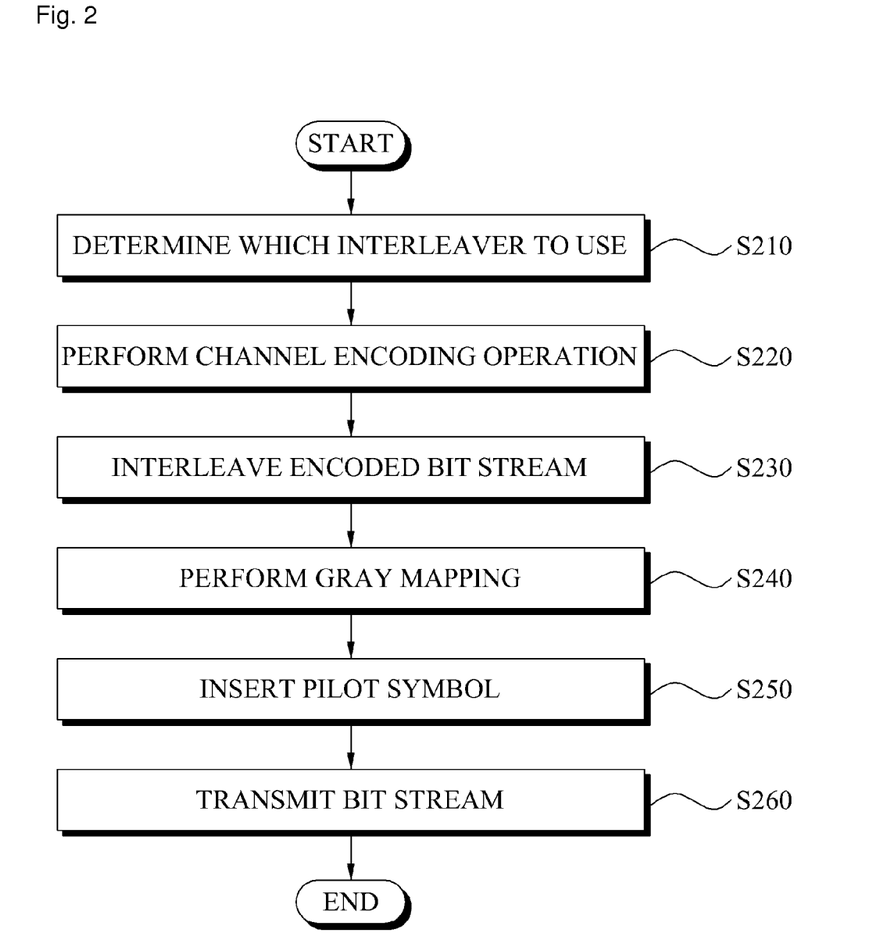
FIG. 2 is a flowchart illustrating a transmission method according to an embodiment of the present invention.

FIG. 2 is a flowchart illustrating a transmission method according to an embodiment of the present invention.

Referring to FIG. 1, the transmission method may be performed by a transmission apparatus in the horizontal encoding structure, as shown in FIG. 1. The transmission apparatus may use a separate interleaver for each bit stream.

In operation S210, the transmission apparatus determines which interleaver to use before an iterative transmission is performed.

In operation S220, the transmission apparatus performs a channel encoding operation for each bit stream.

In operation S230, the transmission apparatus interleaves the encoded bit stream.

In operation S240, the transmission apparatus performs Gray mapping for the interleaved bit stream.

In operation S250, the transmission apparatus inserts a pilot symbol into the mapped bit stream.

In operation S260, the transmission apparatus transmits the bit stream with the inserted pilot symbol via a transmit antenna.

As described above, the transmission method according to the present invention may sequentially perform the determining operation S210, the channel encoding operation S220, the interleaving operation S230, the mapping operation S240, the pilot insertion operation S250, and the transmitting operation S260.

It is assumed herein that a transmitted signal is a quasi-static channel not changing for a single packet length. Also, when a channel coefficient between an $i^{th}$ transmit antenna and a $j^{th}$ receive antenna is defined as $h_{j,i}$ and a channel coefficient vector between the $i^{th}$ transmit antenna and the $j^{th}$ receive antenna and is defined as $h_i = [h_{1,i} h_{2,i} \ldots h_{N_r,i}]^T$, the entire channel matrix may be represented as, $$H = [h_1 \; h_2 \; \ldots \; h_{N_t}] = \begin{bmatrix} h_{11} & h_{12} & \ldots & h_{1N_t} \\ h_{21} & h_{22} & \ldots & h_{2N_t} \\ \vdots & \vdots & \ddots & \vdots \\ h_{N_r 1} & h_{N_r 2} & \ldots & h_{N_r N_t} \end{bmatrix}.$$ [Equation 1]

In this instance, when a transmission signal, transmitted via the $i^{th}$ transmit antenna in an $n^{th}$ symbol slot, is defined as $s_{n,i}$ and a received signal, received via the $j^{th}$ receive antenna in the $n^{th}$ symbol slot, is defined as $y_{n,j}$ a received signal vector in the $n^{th}$ symbol slot is $y_n = [y_{n,1} y_{n,2} \ldots y_{n,N_r}]^T$ where T denotes a vector transpose matrix.

The received signal vector, received at a receiver via the $j^{th}$ receive antenna in the $n^{th}$ symbol slot, may be represented as, $y_n = H s_n + v_n$ [Equation 2], where $$s_n = [s_{n,1} s_{n,2} \ldots s_{n,N_t}]^T$$

denotes a transmission symbol vector, $$v_n = [v_{1,n} v_{2,n} \ldots v_{N_r,n}]^T$$

denotes a noise signal vector, and $$R_{vv} = E(v_n^H v_n)$$

denotes noise variance of the noise signal vector. Since the receiver is unaware of
H
and
$R_{vv}$,
they need to be estimated. When
$s_{n,k}$
is a desired signal, Equation 2 may be expressed as, $$y_n = h_k s_{n,k} + H_k s_{k,n} + v_n, \quad \text{[Equation 3]}$$

where
$H_k$
denotes a channel matrix without
$h_k$
in
H
and
$s_{n,k}$
denotes a transmission symbol vector with a $k^{th}$ column in
$s_n$.

An iterative receiver according to the present invention may operate based on a packet unit consisting of N symbols. A received signal Y of the entire single packet may be expressed as a vector matrix as given by, $$Y = HS + V, \quad \text{[Equation 4]}$$

where $Y = [y_1 y_2 \ldots y_N]$, $S = [s_1 s_2 \ldots s_N]$, and $V = [v_1 v_2 \ldots v_N]$.

Figure 3:
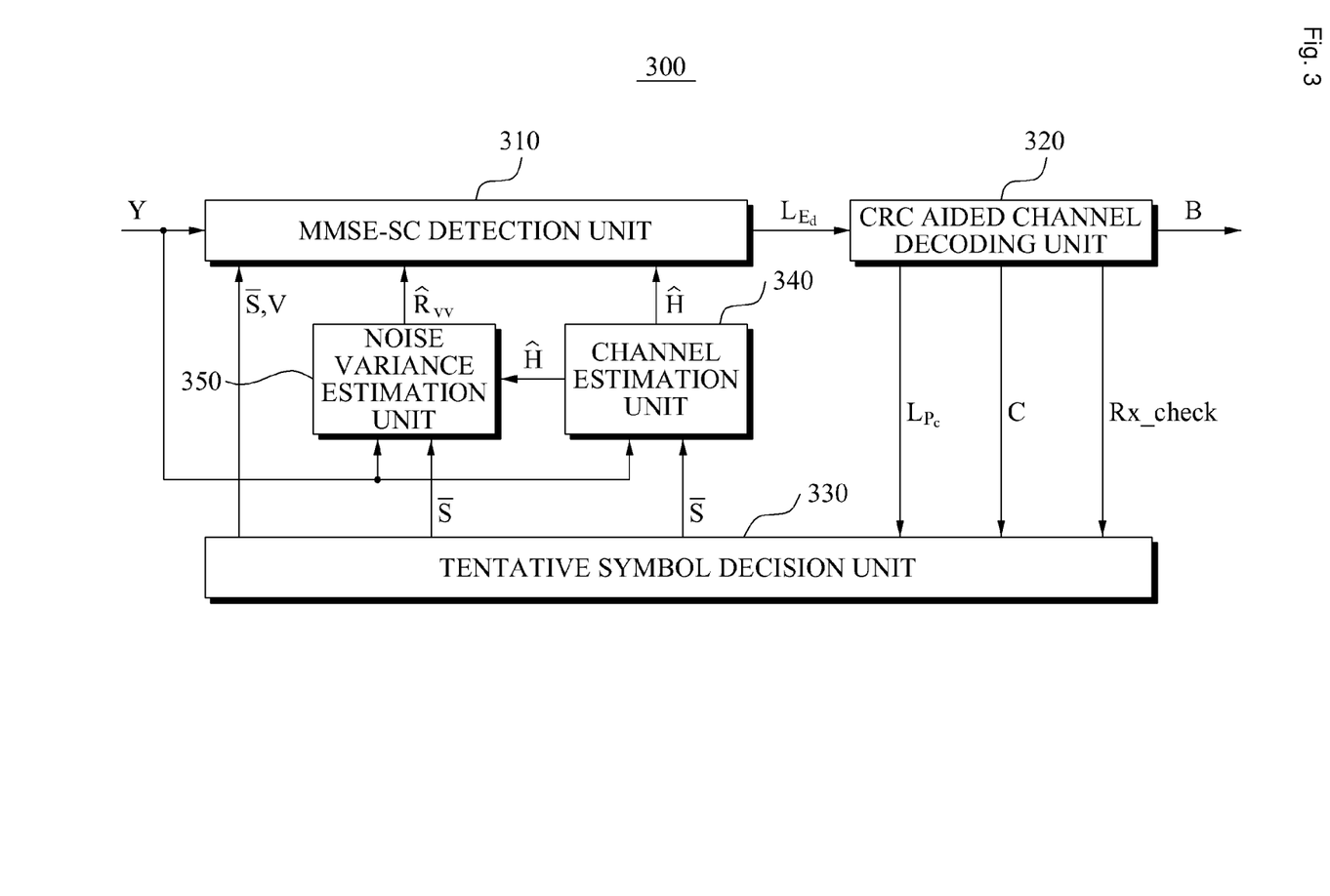
FIG. 3 is an apparatus illustrating a configuration of a reception apparatus according to an embodiment of the present invention.

FIG. 3 is an apparatus illustrating a configuration of a reception apparatus 300 according to an embodiment of the present invention.

Referring to FIG. 3, the reception apparatus 300 includes a minimum mean squared error with soft cancellation (MMSE-SC) detection unit 310, a Cyclic Redundancy Check (CRC) aided channel decoding unit 320, a tentative symbol decision unit 330, a channel estimation unit 340, and a noise variance estimation unit 350.

The MMSE-SC detection unit 310 may output bit extrinsic log-likelihood ratio (LLR)
$L_{E_d}^{(q+1)}$
based on output signal
$\bar{s}^{(q)}$
of the tentative symbol decision unit 330, output signal
$\hat{H}^{(q)}$
of the channel estimation unit 340, output signal
$\hat{R}_{vv}^{(q)}$
of the noise variance estimation unit 350, and received signal Y that are obtained from a previous iteration process. Hereinafter, a configuration and operation of the MMSE-SC detection unit 310 will be described in detail with reference to FIG. 5.

Figure 5:
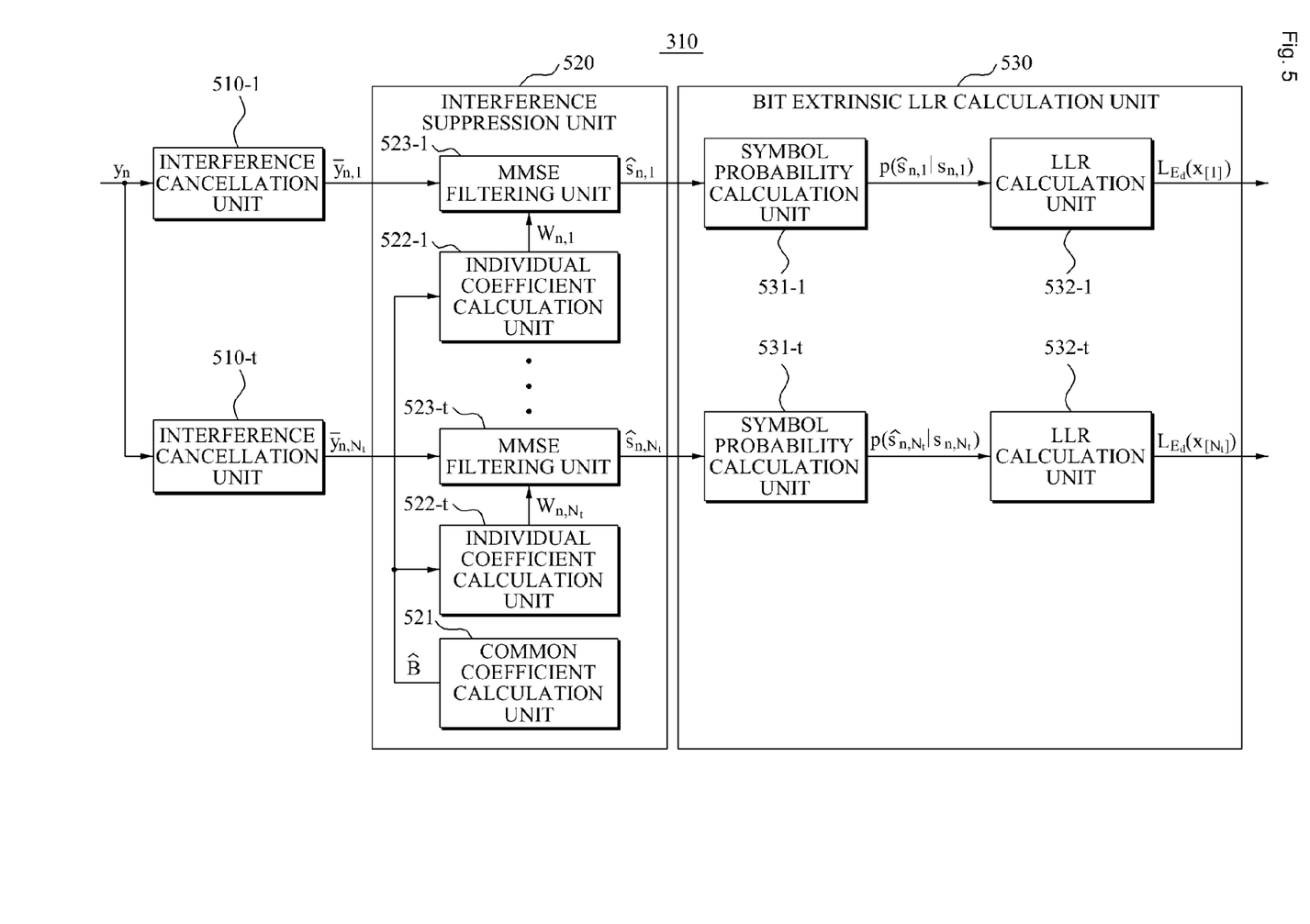
FIG. 5 is a block diagram illustrating a configuration of a minimum mean squared error with soft cancellation (MMSE-SC) detection unit shown in FIG. 3.

FIG. 5 is a block diagram illustrating a configuration of the MMSE-SC detection unit 310 shown in FIG. 3.

Referring to FIG. 5, the MMSE-SC detection unit 310 includes interference cancellation units 510-1, . . . , 510-t, an interference suppression unit 520, and a bit extrinsic LLR calculation unit 530. $N_t$ MMSE-SC detection unit 310 is disposed in parallel to separately detect bit streams, respectively.

The MMSE-SC detector 310 needs an MMSE coefficient vector for each bit stream, whereas an existing scheme requires $N_r \times N_t$ matrix inversion for each bit stream. When the CRC aided channel decoding unit 320 determines no error has occurred, the MMSE-SC detection unit 310 may not need to perform MMSE-SE detection for a corresponding bit stream. Therefore, it is possible to reduce the complexity associated with the MMSE-SC detection.

Specifically, if $N_a$ signals were successfully received by previous iterations, the MMSE-SE detection unit 310 may re-define the received signals as shown in the following Equation 5 whereby the MMSE-SE detection unit 310 may simplify the simultaneous joint detection with respect to $N_t$ signals to the simultaneous joint detection with respect to $$\check{N}_t = N_t - N_a$$

signals. In this instance, since the MMSE-SC detection unit 310 requires $$\check{N}_r \times \check{N}_t$$

matrix inversion in order to a new MMSE coefficient vector, it is possible to reduce a calculation amount.

$$\check{y}_n = \check{H}\check{s}_n + v_n. \quad \text{[Equation 5]}$$

In this instance,
$\check{H}$
consists of channel vectors corresponding to a signal including an error in
H.
Also,
$\check{H}$
has the size of $$N_r \times \check{N}_r.$$

$\check{s}_n$
denotes a transmission symbol vector consists of only signals with the error.

The interference cancellation units 510-1, . . . , 510-t may cancel interference in the received signals, as given by, $$\bar{y}_{n,k}^{(q+1)} = y_n - \hat{H}_k^{(q)} \bar{s}_{n,k}^{(q)} \quad \text{[Equation 6]}$$

where
$\hat{H}_k^{(q)}$
denotes a channel matrix of
$H_k$
that is estimated by the channel estimation unit 340 in a $q^{th}$ iteration, and
$\bar{s}_{n,k}^{(q)}$
denotes a tentative symbol decision of
$s_{n,k}$
that is obtained in the $q^{th}$ iteration.

Specifically, the interference cancellation units 510-1, . . . , 510-t may estimate interference based on the output signal of the tentative symbol decision unit 320 and the output signal of the channel estimation unit 340 that are obtained in the previous iteration to cancel the interference in the received signal Y.

The interference suppression unit 520 may multiply an output of the interference cancellation units 510-1, . . . , 510-t by an MMSE coefficient to suppress remaining interference. The interference suppression unit 520 includes a common coefficient calculation unit 521, individual coefficient calculation units 522-1, ..., 522-t, and MMSE filtering units 523-1, ..., 523-t.

The common coefficient calculation unit 521 may calculate a common coefficient, as given by, $$\hat{B}^{(q+1)} = \begin{bmatrix} \hat{b}_1^{(q+1)} \\ \hat{b}_2^{(q+1)} \\ \vdots \\ \hat{b}_{N_t}^{(q+1)} \end{bmatrix} \quad \text{[Equation 7]}$$

$$= \left( (\check{Q}_n^{(q)})^{-1} + (\check{H}^{(q)})^H (\hat{R}_{vv}^{(q)})^{-1} \check{H}^{(q)} \right)^{-1}$$

$$(\check{H}^{(q)})^H (\hat{R}_{vv}^{(q)})^{-1},$$

where
$\check{H}^{(q)}$
is an estimate of
$\check{H}$
and
$\check{Q}_n^{(q)}$
is an estimate of a variance vector of
$\check{s}_n$.
The estimate
$\check{Q}_n^{(q)}$
may be calculated as given by, $$\check{Q}_n^{(q)} = \text{diag}((v_{n,1}^{(q)})^2, (v_{n,2}^{(q)})^2, \ldots, (v_{n,\bar{N}_t}^{(q)})^2), \quad \text{[Equation 8]}$$

where
$(v_{n,j}^{(q)})^2$
denotes a variance of
$\bar{s}_{n,j}^{(q)}$
and is obtained by the tentative symbol decision unit 320 in the previous iteration.
$\hat{R}_{vv}^{(q)}$
and
$\check{Q}_n^{(q)}$
are diagonal matrices and thus do not need matrix inversion. Therefore, once $\bar{N}_t \times \bar{N}_t$ matrix inversion is overall required.

The individual coefficient calculation units 522-1, ..., 522-t of the $k^{th}$ MMSE-SC detection unit 310 may calculate individual coefficients as given by, $$w_{n,k}^{(q+1)} = \frac{\alpha_{n,k}^{(q+1)} (b_{n,k}^{(q+1)})^H}{1 + (\alpha_{n,k}^{(q+1)} - 1) b_{n,k}^{(q+1)} \hat{h}_k^{(q)}}, \quad \text{[Equation 9]}$$

where $$\alpha_{n,k}^{(q+1)} = \frac{\sigma_s^2}{(v_{n,k}^{(q)})^2}.$$

The MMSE filtering units 523-1, ..., 523-t may perform MMSE filtering as given by, $$\hat{s}_{n,k}^{(q+1)} = (w_{n,k}^{(q+1)})^H y_{n,k}^{(q+1)}, \quad \text{[Equation 10]}$$

where
$s_{n,k}$
is defined as a Gray-mapping symbol to an
$M_c$
number of bits $x_{n,k,1}, x_{n,k,2}, \ldots, x_{n,k,M_c}.$ Specifically, $s_{n,k} = \text{Mapping}(x_{n,k,1}, x_{n,k,2}, \ldots, x_{n,k,M_c}.$ $N_t$ bit extrinsic LLR calculation units 530 may be disposed in parallel. Each bit extrinsic LLR calculation unit 530 includes symbol probability calculation units 531-1, ..., 531-t and LLR calculation units 532-1, ..., 532-t.

The symbol probability calculation units 531-1, ..., 531-t may calculate the symbol probability, as given by, $$p(\hat{s}_{n,k} | s_{n,k}) = \frac{1}{v_{n,k}^2 \pi} \exp\left(-\frac{|\hat{s}_{n,k} - \mu_{n,k} s_{n,k}|^2}{v_{n,k}^2}\right), \quad \text{[Equation 11]}$$

where
$\mu_{n,k} = w_{n,k}^H h_k$
and
$v_{n,k}^2 = E_s \mu_{n,k}(1 - \mu_{n,k}).$ The LLR calculation units 532-1, ..., 532-t may calculate LLRs as given by, $$L_{E_d}(x_{n,k,m}) = \ln \frac{\sum_{s_{n,j} \in \mathbb{S}_{n,j}^{+1}} p(\hat{s}_{n,j} | s_{n,j})}{\sum_{s_{n,j} \in \mathbb{S}_{n,j}^{-1}} p(\hat{s}_{n,j} | s_{n,j})}, \quad \text{[Equation 12]}$$

where
$\mathbb{S}_{n,j}^{+1}$
denotes a combination of
$s_{n,j}$
consisting of
$2^{M_c-1}$
sets corresponding to
$x_{n,j,m} = +1$
among the entire
$2^{M_c}$
sets of
$s_{n,j}$,
and
$\mathbb{S}_{n,j}^{-1}$
denotes a combination of
$s_{n,j}$
consisting of
$2^{M_c-1}$
sets corresponding to
$x_{n,j,m} = -1$
among the entire
$2^{M_c}$
sets of
$s_{n,j}$.

The typical scheme of calculating bit extrinsic LLR $L_{E_d}(x_{n,k,m})$ uses extrinsic information given by a channel decoding unit as a priori information of a detection unit. However, in the case of using Gray mapping, independency between bits in a single symbol exists and thus a priori information of another bit does not do any good.

Accordingly, since the present invention calculates the bit extrinsic LLR without using a priori information, the present invention uses only $\hat{s}_{n,k}$ without requesting the CRC aided channel decoding unit 320 for any feedback.

The CRC aided channel decoding unit 320 may output a coded bit or a posteriori LLR thereof through a CRC aid using the bit extrinsic LLR. Specifically, when it is determined no error has occurred while receiving a packet due to the CRC aid, the CRC aided channel decoding unit 320 may output the coded bit. Conversely, when it is determined an error has occurred, the CRC aided channel decoding unit 320 may output the a posteriori LLR of the coded bit. Hereinafter, a configuration and operation of the CRC aided channel decoding unit 320 will be described in detail with reference to FIG. 6.

Figure 6:
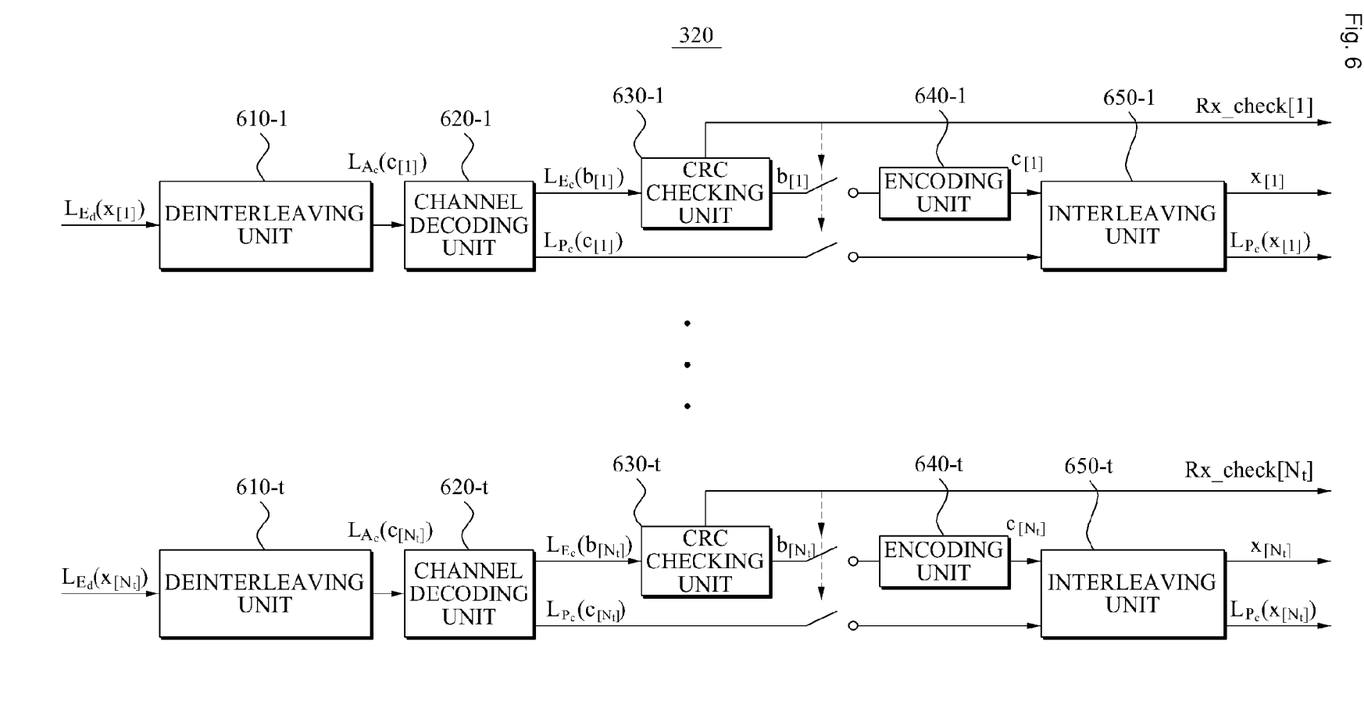
FIG. 6 is a block diagram illustrating a configuration of a Cyclic Redundancy Check (CRC) aided channel decoding unit shown in FIG. 3.

FIG. 6 is a block diagram illustrating a configuration of the CRC aided channel decoding unit 320 shown in FIG. 3.

Referring to FIG. 6, the CRC aided channel decoding unit 320 includes a deinterleaving units 610-1, ..., 610-t, channel decoding units 620-1, ..., 620-t, CRC checking units 630-1, ..., 630-t, encoding units 640-1, ..., 640-t, and interleaving units 650-1, ..., 650-t.

The CRC aided channel decoding unit 320 may receive bit extrinsic LLR $L_{E_d}^{(q+1)}$ from the MMSE-SC detection unit 320 to generate a priori LLR $L_{A_c}^{(q+1)}$ of the channel decoding units 620-1, ..., 620-t via the deinterleaving units 610-1, ..., 610-t.

The channel decoding units 620-1, ..., 620-t may calculate transmission information bit extrinsic LLR $L_{E_c}^{(q+1)}$ using the a priori LLR $L_{A_c}^{(q+1)}$ to output the calculated transmission information bit extrinsic LLR $L_{E_c}^{(q+1)}$ to the CRC checking units 630-1, ..., 630-t.

The CRC checking units 630-1, ..., 630-t may perform CRC check for the transmission information bit extrinsic LLR $L_{E_c}^{(q+1)}$ to determine whether an error has occurred while receiving packet. As a result, when it is determined no error has occurred while receiving the packet, the CRC checking units 630-1, ..., 630-t may set Rx_check to "1" and close an upper switch to thereby encode corresponding received information bits via the encoding units 640-1, ..., 640-t and output the encoded corresponding received information bits to the interleaving units 650-1, ..., 650-t, respectively. For example, when it is determined an error has occurred, the CRC checking units 630-1, ..., 630-t may set Rx_check to "0" and close a lower switch to generate a posteriori LLR $L_{P_c}^{(q+1)}$, output from the channel decoding units 620-1, ..., 620-t, as priori LLR $L_{A_d}^{(q+1)}$ of the tentative symbol decision unit 330 via the interleaving units 650-1, ..., 650-t.

The tentative symbol decision unit 330 may determine tentative symbol $\bar{s}^{(q+1)}$ based on an output of the CRC aided channel decoding unit 320. Specifically, the tentative symbol decision unit 330 may tentatively determine the transmission symbol based on the output of the CRC aided channel decoding unit 320. Hereinafter, a configuration and operation of the tentative symbol decision unit 330 will be described in detail with reference to FIG. 7.

Figure 7:
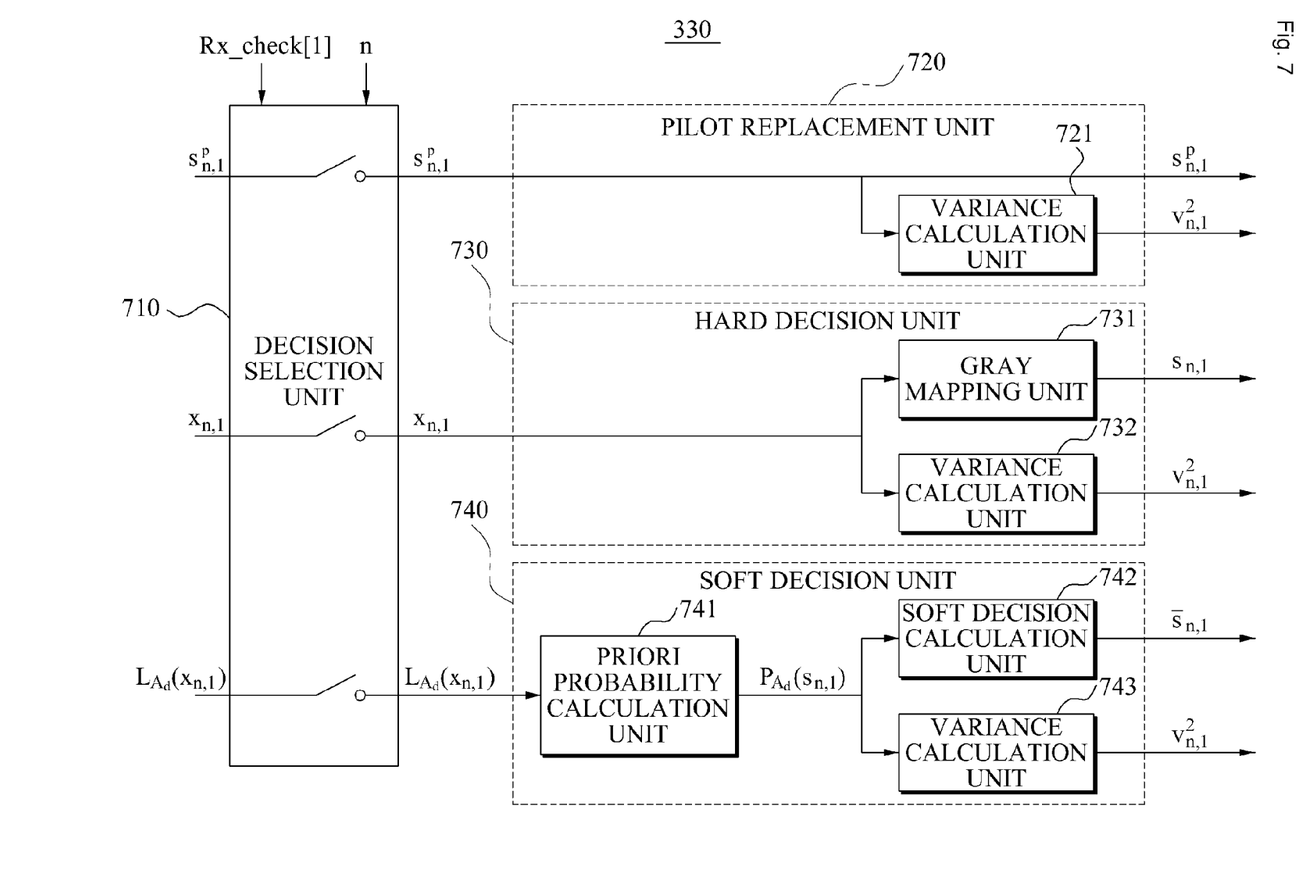
FIG. 7 is a block diagram illustrating a configuration of a tentative symbol decision unit shown in FIG. 3.

FIG. 7 is a block diagram illustrating a configuration of the tentative symbol decision unit 330 shown in FIG. 3.

Referring to FIG. 7, the tentative symbol decision unit 330 includes a decision selection unit 710, a pilot replacement unit 720, a hard decision unit 730, and a soft decision unit 740.

The decision selection unit 710 may select a tentative decision scheme based on Rx_check and symbol time index n. For example, the decision selection unit 710 may select any one decision scheme from three tentative symbol decision schemes based on Rx_check and the symbol time index n.

When the transmission symbol is determined as a pilot symbol as a result of checking the symbol time index n, the pilot replacement unit 720 may replace the tentative symbol decision $\bar{s}_{n,k}^{(q+1)}$ of $s_{n,k}$ with pilot symbol $s_{n,k}^{p}$.

Specifically, $\bar{s}_{n,k}^{(q+1)} = s_{n,k}^{p}$.

A variance calculation unit 721 calculates variance of the tentative symbol decision $\bar{s}_{n,k}^{(q+1)}$.

The variance of the tentative symbol decision $\bar{s}_{n,k}^{(q+1)}$ is $\mathrm{var}\{s_{n,k}^{(q+1)}\} = 0$.

Also, when the transmission symbol is determined as an information symbol as the result of checking the symbol time index n and Rx_check is "1", the hard decision unit 730 may perform Gray mapping for an interleaved bit, received without causing an error, via a Gray mapping unit 731 to generate tentative symbol decision $\bar{s}^{(q+1)}$.

Specifically, $\bar{s}^{(q+1)} = s$.

Also, the hard decision unit 730 calculates variance of the errorlessly received interleaved bit via a variance calculation unit 732. The variance of $\bar{s}_{n,k}^{(q+1)}$ is $\mathrm{var}\{s_{n,k}^{(q+1)}\} = 0$.

Also, when the transmission symbol is determined as the information symbol as the result of checking the symbol time index n and Rx_check is "0", the soft decision unit 740 may calculate a bit probability and a symbol probability via a priori probability calculation unit 741. The bit probability may be calculated using a posteriori LLR $L_{P_c}^{(q+1)}(x)$ of the channel decoding unit, as given by, $$p_{A_d}^{(q+1)}(x_{n,k,m}) = \frac{e^{\pm L_{P_c}^{(q+1)}(x_{n,k,m})}}{1 + e^{\pm L_{P_c}^{(q+1)}(x_{n,k,m})}}. \quad \text{[Equation 13]}$$

The symbol probability may be calculated as given by, $$p_{A_d}^{(q+1)}(s_{n,k}) = \prod_{m=1}^{M_c} P_{A_d}^{(q+1)}(x_{n,k,m}).$$ [Equation 14]

A soft decision calculation unit 742 may determine
$\bar{s}^{(q+1)}$
and perform soft decision, as given by, $$\bar{s}_{n,k}^{(q+1)}(n) = \mathbb{E}\{s_{n,k}^{(q+1)}\} = \sum_{s_k \in \mathbb{S}} s_{n,k} p_{A_d}^{(q+1)}(s_{n,k}),$$ [Equation 15]

where
$\mathbb{S}_{n,j}$
is a total number of
$2^{M_c}$
sets of
$s_{n,j}$.

A variance calculation unit 743 may calculate symbol variance as given by, $$\text{var}\{s_{n,k}^{(q+1)}\} = \sum_{s_{n,k} \in \mathbb{S}} |s_{n,k}^{(q+1)}|^2 p_{A_d}^{(q+1)}(s_{n,k}) - (\bar{s}_{n,k}^{(q+1)})^2.$$ [Equation 16]

The channel estimation unit 340 may estimate channel
$\hat{H}^{(q+1)}$
based on output signal
$\bar{s}^{(q+1)}$
of the tentative symbol decision unit 330 and the received signal Y. An estimate of
H
in the (q+1)$^{th}$ iteration may be represented as, $$\hat{H}^{(q+1)} = \left(\sum_{n=1}^{N} y(\bar{s}_n^{(q+1)})^H\right)\left(\sum_{n=1}^{N} \bar{s}_n^{(q+1)}(\bar{s}_n^{(q+1)})^H\right)^{-1},$$ [Equation 17]

where $$\bar{s}_n^{(q+1)} = [\bar{s}_{n,1}^{(q+1)} \bar{s}_{n,2}^{(q+1)} \ldots \bar{s}_{n,N_t}^{(q+1)}]^T.$$

An initial value of the channel estimation unit 340 may be obtained based on the pilot symbol. When all the transmitters simultaneously transmit pilot symbols in a single pilot symbol slot, an initial channel value may be represented as, $$\hat{H}^{(0)} = \left(\sum_{n=1}^{N_p} y_n(s_n^p)^H\right)\left(\sum_{n=1}^{N_p} s_n^p(s_n^p)^H\right)^{-1},$$ [Equation 18]

where
$s^p(n)$
denotes a transmit pilot symbol vector transmitted in an nth symbol slot and
$N_p$
pilot symbol vectors are transmitted with respect to a single packet.

The noise variance estimation unit 350 may estimate noise variance
$\hat{R}_{vv}^{(q+1)}$
based on the output signal
$\bar{s}^{(q+1)}$
of the tentative symbol decision unit 330, the output signal
$\hat{H}^{(q+1)}$
of the channel estimation unit 340, and the received signal Y. An estimate of
$R_{vv}$
in the (q+1)$^{th}$ iteration may be represented as, $$\hat{R}_{vv}^{(q+1)} = \frac{1}{N}\sum_{n=1}^{N}(y_n - \hat{H}^{(q+1)}\bar{s}_n^{(q+1)})(y_n - \hat{H}^{(q+1)}\bar{s}_n^{(q+1)})^H.$$ [Equation 19]

An initial value of noise variance matrix estimation may be obtained based on the pilot symbol. When all the transmitters simultaneously transmit pilot symbols in a single pilot symbol slot, an initial estimate may be represented as, $$\hat{R}_{vv}^{(0)} = \frac{1}{N_p}\sum_{n=1}^{N_p}(y_n - \hat{H}^{(0)}\bar{s}_n^p)(y_n - \hat{H}^{(0)}\bar{s}_n^p)^H.$$ [Equation 20]

Figure 4:
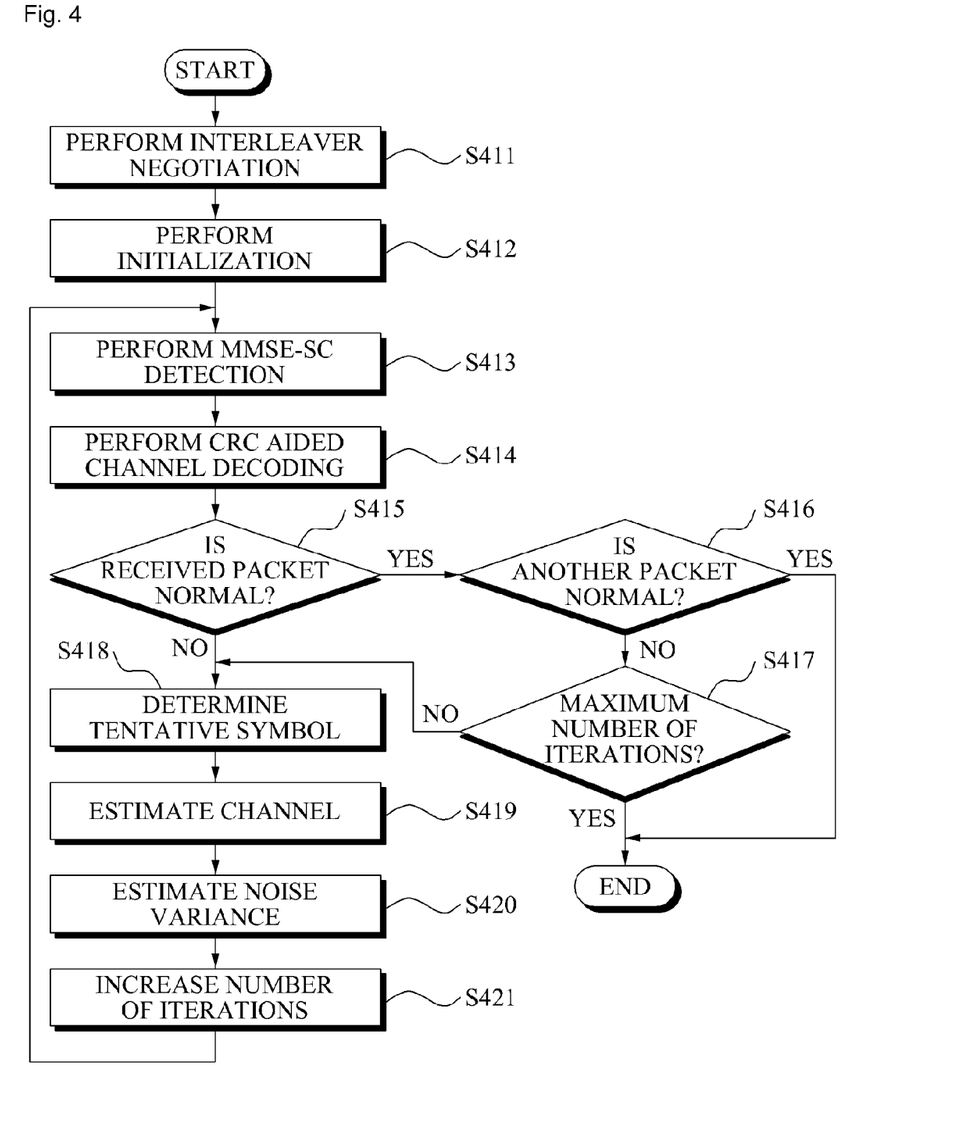
FIG. 4 is a flowchart illustrating a reception method according to an embodiment of the present invention.

FIG. 4 is a flowchart illustrating a reception method according to an embodiment of the present invention.

Referring to FIG. 4, in operation S411, a reception apparatus performs interleaver negotiation corresponding to the transmission method shown in FIG. 2.

In operation S412, when the interleaver negotiation is completed, the reception apparatus performs initialization. Specifically, in operation S412, as an initial stage for iterative receiving, the reception apparatus obtains channel
$\hat{H}^{(0)}$
and noise variance
$\hat{R}_{vv}^{(0)}$
using a pilot symbol, and then performs initialization, that is,
$\bar{S}^{(0)} = 0$
and
q=0.

Next, the reception apparatus performs parallel MMSE-SC detection for each packet or for each bit stream in operation S413 and performs CRC aided channel decoding in operation S414. By performing operations S415 through S417, when its own packet is received without causing an error, the reception apparatus determines whether all the packets transmitted via other transmit antennas are also received without causing an error.

In operation S413, the reception apparatus determines bit extrinsic LLR
$L_{E_c}^{(q+1)}$
based on output signal
$\bar{s}^{(q)}$
of tentative symbol decision operation S418, output signal
$\hat{H}(q)$
of channel estimation operation S419, output signal
$\hat{R}_{vv}^{(q)}$
of noise variance estimation operation S420, and the received signal Y, which are obtained from the previous iteration process. Specifically, in operation S413, the reception apparatus may estimate interference based on the output signal of the tentative symbol decision operation 418 and the output signal of the channel estimation operation 419 that are obtained from the previous iteration process, to remove the estimated interference in the received signal Y. In operation S413, the reception apparatus may multiply the interference canceled signal by an MMSE coefficient to suppress remaining interference. In operation S413, the reception apparatus may calculate bit extrinsic LLR based on an estimate of a desired symbol corresponding to the interference suppressed signal.

In operation S414, the reception apparatus performs CRC aided channel decoding for outputting an interleaved bit or a posteriori LLR thereof based on the bit extrinsic LLR.

In operation S415, the reception apparatus determines whether a received packet is normal. Specifically, in operation S415, the reception apparatus may determine whether the packet is received without causing any error.

When the received packet is normal, the reception apparatus determines whether another packet is normal in operation S416. Specifically, when the packet is received without causing any error, the reception apparatus may determine whether all the other packets transmitted via the other transmit antennas are received without causing any error.

When the other packet is not normal, that is, when it is determined the error has occurred, the reception apparatus determines whether a number of iterations q has reached a maximum number of iterations Q, i.e.

$$q+1=Q$$

in operation S417.

Conversely, when the other packet is normal, or when it is determined the number of iterations has reached the maximum number of iterations, the reception apparatus terminates the iteration.

When the other packet is normal, or when the number of iterations q has not reached the maximum number of iterations, i.e.

$$q+1<Q,$$

the reception apparatus determines a tentative symbol in operation S418.

In operation S419, the reception apparatus estimates a channel based on the received signal Y and the tentative symbol determined in operation S418.

In operation S420, the reception apparatus estimates noise variance based on the output signal of the tentative symbol decision operation S418, the output signal of the channel estimation operation S419, and the received signal Y.

In operation S421, the reception apparatus increases the number of iterations by one, i.e. q=q+1. Specifically, in operation S421, the reception apparatus may update the number of iterations and then return to operation S413 to repeat the operations until the number of iterations reaches the maximum number of iterations.

The output signal
$$\overline{s}^{(q+1)}$$
of the tentative symbol decision operation S418 is very important in an aspect that it is used for the MMSE-SC decision operation S413, the channel estimation operation S419, and the noise variance estimation operation S420.

Specifically, according to an aspect of the present invention, when it is determined an error has not occurred, an errorlessly received interleaved bit may be used. Conversely, when it is determined the error has occurred, a posteriori bit LLR of the interleaved bit may be used. Therefore, it is possible to improve the performance of the MMSE-SE detection operation S413 and also reduce the power consumption.

Also, according to an aspect of the present invention, since the iterative estimation is performed by using the reliable output signal
$$\overline{s}^{(q+1)}$$
of the tentative symbol decision operation S418 as an input signal of the channel estimation operation S419 and the noise variance estimation operation S420, the entire reception performance may be improved.

According to the present invention, there may be provided an iterative transmission/reception apparatus and method that can improve the reception performance and also can reduce the complexity and the power consumption in a MIMO system.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system including: a transmission apparatus comprising: at least two encoding units, each configured to encode a bit stream; at least two interleaving units, each configured to interleave the encoded bit stream; at least two Gray mapping units, each configured to perform Gray mapping for the interleaved bit stream; at least two pilot insertion units, each configured to insert a pilot symbol into the mapped bit stream; and at least two transmit antennas, each configured to transmit the bit stream with the inserted pilot symbol, wherein the transmission apparatus has a horizontal encoding structure and is configured to transmit a different bit stream for each transmit antenna; and a reception apparatus configured to receive at least one of the different bit stream for each transmit antenna transmitted by the transmission apparatus, comprising: a detection unit configured to detect extrinsic information based at least partly on an output of a tentative symbol decision unit associated with the received at least one of the different bit stream for each transmit antenna transmitted by the transmission apparatus; and a decoding unit configured to output an interleaved bit or a posteriori information thereof based on the extrinsic information.

2. The system of claim 1, wherein each encoding unit is configured to receive and encode an information bit stream to output the encoded bit stream.

3. The system of claim 1, wherein each interleaving unit is configured to receive and interleave the encoded bit stream to output the interleaved bit stream.

4. The system of claim 1, wherein each interleaving unit includes a separate interleaver for each bit stream.

5. The system of claim 1, wherein each Gray mapping unit is configured to receive and perform Gray mapping for the interleaved bit stream to output an information symbol.

6. The system of claim 5, wherein each pilot insertion unit is configured to receive the information symbol to insert the pilot symbol into the information symbol.

7. A reception apparatus comprising: at least one receive antenna configured to receive a signal; a detection unit configured to detect extrinsic information based on a tentative symbol decision signal, a channel estimation signal, a noise variance estimation signal, and a signal received by the at least one receive antenna that are obtained from a previous iteration process; a Cyclic Redundancy Check (CRC) aided channel decoding unit configured to output an interleaved bit or a posteriori information thereof based on the extrinsic information; a tentative symbol decision unit configured to determine a tentative transmission symbol based on an output of the CRC aided channel decoding unit; a channel estimation unit configured to estimate a channel based on an output of the tentative symbol decision unit; and a noise variance estimation unit configured to estimate a noise variance based on the output of the tentative symbol decision unit and an output of the channel estimation unit.

8. The reception apparatus of claim 7, wherein the detection unit comprises:
an interference cancellation unit configured to estimate an interference based on an output signal of the tentative symbol decision unit and an output signal of the channel estimation unit that are obtained from a previous iteration process to cancel the interference in the received signal;
an interference suppression unit configured to multiply an output of the interference cancellation unit by a minimum mean squared error (MMSE) coefficient to suppress remaining interference; and
a bit extrinsic log-likelihood ratio (LLR) calculation unit configured to calculate a bit extrinsic LLR based on an estimate of a desired symbol corresponding to an output of the interference suppression unit.

9. The reception apparatus of claim 7, wherein the CRC aided decoding unit comprises:
a deinterleaving unit configured to receive a bit extrinsic LLR from the detection unit to generate a priori LLR for deinterleaving the bit extrinsic LLR;
a channel decoding unit configured to output a transmission information bit extrinsic LLR and a posteriori LLR of a coded bit based on the priori LLR;
a CRC checking unit configured to check the transmission information bit extrinsic LLR to determine whether an error has occurred while receiving a packet;
an encoding unit configured to encode a received information bit corresponding to an output of the CRC checking unit; and
an interleaving unit configured to interleave the coded bit or the posteriori LLR of the coded bit to generate a priori LLR of the tentative symbol decision unit.

10. The reception apparatus of claim 9, wherein the tentative symbol decision unit comprises:
a decision selection unit configured to select any one decision scheme from a plurality of tentative symbol decision schemes;
a pilot replacement unit configured to replace a tentative symbol decision with a pilot symbol when the transmission symbol is the pilot symbol;
a hard decision unit configured to map a received encoded bit corresponding to the output of the CRC checking unit to determine a tentative symbol, when no error is included in the received packet; and
a soft decision unit configured to determine the tentative symbol with respect to a transmission symbol based on a posteriori LLR of the interleaved bit corresponding to an output of the channel decoding unit, when the error is included in the received packet.

11. The reception apparatus of claim 7, wherein the channel estimation unit is configured to estimate the channel based on the output of the tentative symbol decision unit and the received signal.

12. The reception apparatus of claim 7, wherein the noise variance estimation unit is configured to estimate the noise variance based on the output of the tentative symbol decision unit, the output of the channel estimation unit, and the received signal.

13. A communication method comprising:
performing horizontal encoding and determining which interleaver to use before an iterative transmission is performed at a transmitter using a different interleaver for each bit stream;
encoding a bit stream to be transmitted to each transmit antenna;
interleaving the encoded bit stream;
performing Gray mapping for the interleaved bit stream;
inserting a pilot symbol into the mapped bit stream;
transmitting the bit stream with the inserted pilot symbol via each transmit antenna;
receiving the bit stream;
detecting extrinsic information based at least partly on a tentative symbol decision signal associated with the received bit stream; and
outputting an interleaved bit or a posteriori information thereof based on the extrinsic information.

14. The method of claim 13, wherein the transmitting transmits the bit stream with an inserted different pilot symbol, via each transmit antenna.

15. The method of claim 13, wherein the encoding receives and encodes an information bit stream.

16. The method of claim 15, wherein the interleaving receives and interleaves the encoded bit stream.

17. The method of claim 16, wherein the mapping receives and performs Gray mapping for the interleaved bit stream to output an information symbol.

18. The method of claim 17, wherein the inserting receives the information symbol to insert the pilot symbol into the information symbol.

19. A reception method comprising: by a receiving apparatus including at least one receive antenna, performing operations including the following: a detection operation of detecting extrinsic information based on a tentative symbol decision signal, a channel estimation signal, a noise variance estimation signal, and a signal received by the at least one receive antenna that are obtained from a previous iteration process; a CRC aided channel decoding operation of outputting an interleaved bit or a posteriori information thereof based on the extrinsic information; a tentative symbol decision operation of determining a tentative transmission symbol based on an output of the CRC aided channel decoding operation; a channel estimation operation of estimating a channel based on an output of the tentative symbol decision operation; and a noise variance estimation operation of estimating a noise variance based on the output of the tentative symbol decision operation and an output of the channel estimation operation.

20. The method of claim 19, wherein the CRC aided channel decoding operation comprises:
checking a transmission information bit extrinsic LLR to determine whether an error has occurred while receiving a packet;
determining whether another packet is normal, when it is determined no error has occurred; and
determining whether a number of iterations has reached a maximum number of iterations.

* * * * *